(12) United States Patent
Joung et al.

(10) Patent No.: US 8,013,287 B2
(45) Date of Patent: Sep. 6, 2011

(54) OPTICAL POINTING DEVICE, OPTICAL POINTING SYSTEM, AND METHOD OF OPERATING THE SAME

(75) Inventors: Chul-Yong Joung, Seoul (KR); Bang-Won Lee, Yongin-si (KR); Young-Ho Shin, Yongin-si (KR)

(73) Assignee: Atlab Inc. (KR)

( * ) Notice: Subject to any disclaimer, the term of this patent is extended or adjusted under 35 U.S.C. 154(b) by 1483 days.

(21) Appl. No.: 11/453,528

(22) Filed: Jun. 15, 2006

(65) Prior Publication Data

US 2007/0002022 A1 Jan. 4, 2007

(30) Foreign Application Priority Data

Jul. 4, 2005 (KR) ........................ 10-2005-0059896

(51) Int. Cl.
*G01V 8/00* (2006.01)

(52) U.S. Cl. .................................... 250/222.1; 250/221

(58) Field of Classification Search .................. 345/156, 345/157, 162, 163, 166, 179, 180, 181, 182, 345/183; 382/181, 190, 191, 192, 194, 201, 382/217, 218, 219, 220, 221; 250/221, 222.1
See application file for complete search history.

(56) References Cited

U.S. PATENT DOCUMENTS

| | | | |
|---|---|---|---|
| 6,281,881 B1 * | 8/2001 | Siddiqui et al. ............... | 345/164 |
| 6,303,924 B1 * | 10/2001 | Adan et al. .................... | 250/221 |
| 6,377,249 B1 * | 4/2002 | Mumford ...................... | 345/179 |
| 6,664,948 B2 * | 12/2003 | Crane et al. ................... | 345/166 |
| 6,819,314 B2 | 11/2004 | Black | |
| 7,193,608 B2 * | 3/2007 | Stuerzlinger ................. | 345/156 |
| 7,511,699 B2 * | 3/2009 | Shin .............................. | 345/166 |
| 7,646,379 B1 * | 1/2010 | Drennan et al. .............. | 345/177 |
| 7,667,690 B2 * | 2/2010 | Lee ................................ | 345/166 |

(Continued)

FOREIGN PATENT DOCUMENTS

| | | |
|---|---|---|
| TW | 230315 | 4/2005 |
| TW | 231454 | 4/2005 |

OTHER PUBLICATIONS

Taiwan Office Action for application No. 095122423 dated Feb. 10, 2009 with English translation.

*Primary Examiner* — My-Chau T Tran
(74) *Attorney, Agent, or Firm* — Cantor Colburn LLP (57) ABSTRACT

An optical pointing device includes: an image obtaining part for continuously obtaining an image on a work surface as a sample image; a movement value calculator for comparing the sample image with the previously obtained image to calculate and output a movement value; a button selection signal generator for outputting a button selection signal corresponding to a specific reference pattern, when the sample image is the same as the specific reference pattern of a plurality of reference patterns; and a controller for providing the button selection signal and the movement value to a computing device when the button selection signal is transmitted from the button selection signal generator, and providing the movement value only to the computing device when the button selection signal is not transmitted from the button selection signal generator. Therefore, it is possible to recognize a plurality of specific patterns to generate button selection signals and replace mechanical selection buttons, thereby minimizing manufacturing cost and size of the optical pointing device. In addition, it is possible to readily change the number of button selection signals provided from the optical pointing device by changing the number of specific patterns.

12 Claims, 8 Drawing Sheets

U.S. PATENT DOCUMENTS

| | | | |
|---|---|---|---|
| 2004/0091165 A1* | 5/2004 | Park et al. | 382/260 |
| 2004/0095323 A1* | 5/2004 | Ahn | 345/166 |
| 2005/0161582 A1* | 7/2005 | Lee et al. | 250/205 |
| 2006/0197756 A1* | 9/2006 | Sun | 345/179 |
| 2007/0126699 A1* | 6/2007 | Kwak et al. | 345/157 |
| 2008/0067998 A1* | 3/2008 | Lee et al. | 323/354 |

\* cited by examiner

| | bit7 | bit6 | bit5 | bit4 | bit3 | bit2 | bit1 | bit0 |
|---|---|---|---|---|---|---|---|---|
| byte1 | Packet position | | Don't care | Don't care | Mode info | Don't care | Don't care | Don't care |
| byte2 | ADC DATA | | | | | | | |
| byte3 | ADC DATA | | | | | | | |

(b)

| | bit7 | bit6 | bit5 | bit4 | bit3 | bit2 | bit1 | bit0 |
|---|---|---|---|---|---|---|---|---|
| byte1 | Don't care | Don't care | Don't care | Don't care | Mode info | Don't care | Don't care | Don't care |
| byte2 | ADC DATA LENGTH | | | | | | | |
| byte3 | ADC DATA | | | | | | | |
| ... | | | | | | | | |
| byteN | ADC DATA | | | | | | | |

(c)

| | bit7 | bit6 | bit5 | bit4 | bit3 | bit2 | bit1 | bit0 |
|---|---|---|---|---|---|---|---|---|
| byte1 | Don't care | Don't care | Don't care | Don't care | Mode info | Don't care | Don't care | Don't care |
| byte2 | X Movement | | | | | | | |
| byte3 | Y Movement | | | | | | | |
| byte4 | ADC DATA LENGTH | | | | | | | |
| byte5 | ADC DATA | | | | | | | |
| ... | | | | | | | | |
| byteN+2 | ADC DATA | | | | | | | |

OPTICAL POINTING DEVICE, OPTICAL POINTING SYSTEM, AND METHOD OF OPERATING THE SAME

This application claims priority to and the benefit of Korean Patent Application No. 2005-59896, filed Jul. 4, 2005, the disclosure of which is incorporated herein by reference in its entirety.

BACKGROUND OF THE INVENTION

1. Field of the Invention

The present invention relates to an optical pointing device, and more particularly, to an optical pointing device, an optical pointing system, and a method of operating the same capable of recognizing a specific pattern to generate a button selection signal.

2. Description of the Related Art

An optical pointing device is a human interface device connected to a computer for processing a user's input, which is capable of providing a movement value of the optical pointing device to the computer to move a pointer displayed on a computer screen.

Such an optical mouse further includes a plurality of buttons for processing a user's input. When a user pushes a certain button, the optical mouse transmits a button selection signal corresponding to the pushed button to the computer, and the computer performs an operation corresponding to the pushed button.

The optical mouse generally has two buttons. When a user pushes one of the two buttons to provide a first button selection signal, the computer points or selects certain data. When a user pushes the other button to provide a second button selection signal, the computer performs an operation for setting data properties.

However, the optical mouse has been provided with more number of buttons in order to increase convenience of use.

For example, an optical mouse includes an additional button in addition to the two buttons. When a user pushes the additional button to provide a third button selection signal, the computer scrolls a screen up or down in response to the movement of the additional button.

For another example, an optical mouse includes at least four buttons to use as a hot key for executing a specific application program. That is, the optical mouse provides a plurality of button selection signals, and the computer sets a plurality of commands for executing specific application programs corresponding to the plurality of button selection signals of the optical mouse, similarly to hot keys of a key board. When a button selection signal is received from the optical mouse, the computer executes a command set to the received button selection signal.

Therefore, the optical mouse has more number of buttons so that a user can simply drive many operating or application programs using the optical mouse.

Figure 1:
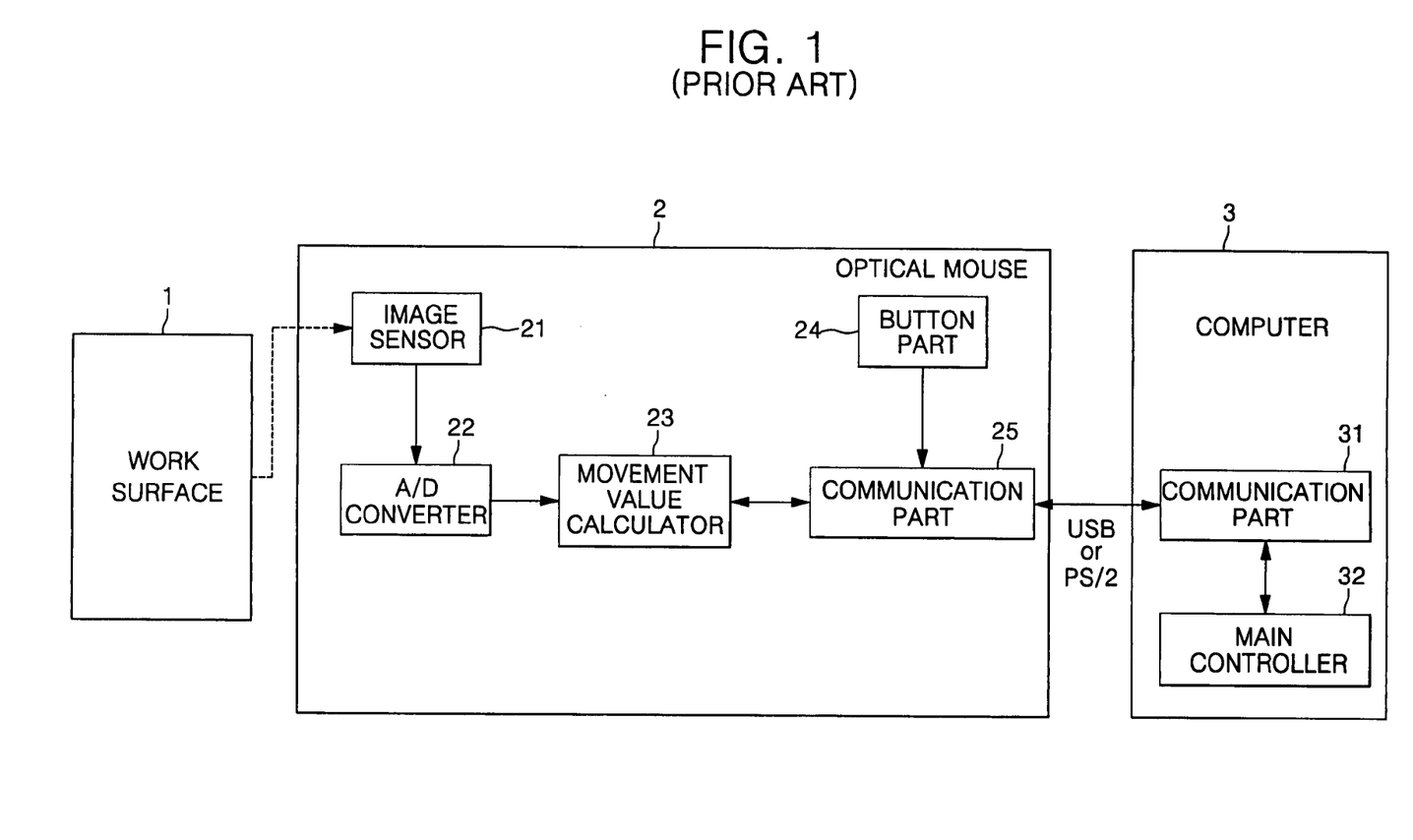
FIG. 1 is a block diagram of a conventional optical mouse.

FIG. 1 illustrates an optical pointing system including an optical mouse for providing a plurality of button selection signals and a computer for performing operations in response to the plurality of button selection signals.

Referring to FIG. 1, a conventional optical pointing system includes an optical mouse 2, and a computer 3. The optical mouse 2 includes an image sensor 21, an A/D converter 22, a movement value calculator 23, a button part 24, and a communication part 25. The computer 3 includes a communication part 31, and a main controller 32.

Hereinafter, each function of the components of the optical mouse will be described.

The image sensor 21 is disposed on a work surface (a mouse pad) 1 to obtain an image of a portion of the work surface as an analog signal. The A/D converter 22 converts the analog signal image provided from the image sensor 21 into digital data recognizable by the movement value calculator 23 of the optical mouse 2.

The movement value calculator 23 receives a sample image transmitted from the A/D converter 22, obtains a correlation of position between the sample image and the previously sampled image, calculates a movement value of the optical mouse 2 responding to the correlation, and transmits the calculated movement value to the communication part 25.

The button part 24 includes a plurality of mechanical buttons, each of which generates a corresponding button selection signal in response to a button push operation of a user.

Therefore, the optical mouse 2 in FIG. 1 can provide the same number of button selection signals as the number of mechanical buttons. That is, when the button part 24 includes eight mechanical buttons, the optical mouse 2 can provide eight button selection signals to the computer.

The communication part 25 is an interface device such as a universal serial bus (USB) or a personal system/2 (PS/2), which interfaces data between the computer 3 and the optical mouse 2 according to a USB or PS/2 protocol.

Specifically, when a movement value or a button selection signal is received, the communication part 25 converts it into data having a data format according to the USB or PS/2 protocol to transmit the data to the computer 3. When the data having a data format according to the USB or PS/2 protocol is received, the communication part 25 obtains control data from the received data to process the control data.

Then, each function of the components of the computer 3 will be described.

The communication part 31 is an interface device such as a USB or PS/2, similarly to the communication part 25 of the optical mouse 2, which also interfaces data between the computer 3 and the optical mouse 2.

Specifically, when data having a data format according to a USB or PS/2 protocol is received from the optical mouse 2, the communication part 31 transmits a movement value or a button selection signal of the received data to the main controller 32, and when control data from the main controller 32 is received, the communication part 31 converts the control data into the data having a data format according to the USB or PS/2 protocol to transmit the data to the optical mouse 2.

The main controller 32 is a device such as a central processing unit (CPU) for controlling the general operation of the computer, which sets commands for executing specific operations or application programs corresponding to the plurality of button selection signals provided by the optical mouse 2. When the button selection signal of the optical mouse 2 is received through the communication part 31, the computer executes a command set to the button selection signal to execute a specific function or a specific application program. When the movement value of the optical mouse 2 is received through the communication part 31, the computer 3 moves a pointer displayed on a screen.

As described above, in the conventional optical pointing system, the optical mouse includes mechanical buttons to provide a button selection signal corresponding to a pushed button when a user pushes a specific button to the computer, and the computer executes a command set to the button selection signal. Therefore, the user pushes the buttons of the optical mouse to request a specific operation of the computer.

However, since the buttons of the optical mouse shown in FIG. 1 are mechanical buttons, in order to increase the number of button selection signals provided by the optical mouse, the optical mouse should have more number of mechanical buttons.

As a result, in proportion to the number of mechanical buttons included in the optical mouse, the size of the optical mouse was increased, and material and mold costs for forming the mechanical buttons should be increased.

In addition, once the number of buttons of the optical mouse is determined during a product design process, it was difficult to change the number of buttons during the following product manufacturing process.

Here, optical mouse is explained as an example. It is natural to extend to any optical pointing device such as, not limited, optical pen mouse, optical presentation mouse, and optical finger movement navigation device.

BRIEF SUMMARY OF THE INVENTION

In order to solve the foregoing and/or other problems, it is an aspect of the present invention to provide an optical pointing device, an optical pointing system, and a method of operating the same, capable of generating a button selection signal by recognizing a plurality of specific patterns, thereby minimizing manufacturing cost and size of the optical pointing device.

It is another aspect of the present invention to provide an optical pointing device, an optical pointing system, and a method of operating the same, capable of changing the number of specific patterns and reference patterns to readily change the number of button selection signals, which can be provided by the optical pointing device.

Additional aspect and advantages of the present invention will be set forth in part in the description which follows and, in part, will be obvious from the description, or may be learned by practice of the invention.

The foregoing and/or other aspects of the present invention may be achieved by providing an optical pointing device including: an image obtaining part for continuously obtaining an image on a work surface as a sample image; a movement value calculator for comparing the sample image with the previously obtained image to calculate and output a movement value; a button selection signal generator for outputting a button selection signal corresponding to a specific reference pattern, when the sample image is the same as the specific reference pattern of a plurality of reference patterns; and a controller for providing the button selection signal and the movement value to a computer when the button selection signal is transmitted from the button selection signal generator, and providing the movement value only to the computer when the button selection signal is not transmitted from the button selection signal generator.

Another aspect of the present invention may be achieved by providing an optical pointing system including; an optical pointing device for obtaining an image of a work surface as a sample image, calculating a movement value on the basis of the sample image, providing the movement value in a general mode, and outputting the sample image in a pattern recognition mode; and a computer for setting commands corresponding to a plurality of reference patterns, detecting a reference pattern having the same pattern as the sample image to execute the command set to the reference pattern when the sample image is received, and moving a pointer displayed on a screen in response to the movement value when the movement value is received.

Still another aspect of the present invention may be achieved by providing a method of operating an optical pointing device including the steps of: obtaining a sample image; comparing the sample image with a reference sample image to calculate a movement value; retrieving a plurality of reference patterns to obtain a reference pattern having the same pattern as the sample image, and generating a button selection signal corresponding to the obtained reference pattern; and providing the button selection signal and the movement value to a computer when the button selection signal is generated, and providing the movement value only to the computer when the button selection signal is not generated.

Yet another aspect of the present invention may be achieved by providing a method of operating an optical pointing system comprising an optical pointing device, and a computer for performing a predetermined operation according to data of the optical pointing device, the method including: an optical pointing device operating step of obtaining a sample image, calculating a movement value on the basis of the sample image, providing the movement value in a general mode, and outputting a sample image in a pattern recognition mode; and a computer operating step of retrieving a plurality of reference patterns to detect a reference pattern having the same pattern as the sample image and execute a command set to the reference pattern when the sample image is received, and moving a pointer displayed on a screen in response to the movement value when the movement value is received.

BRIEF DESCRIPTION OF THE DRAWINGS

These and/or other aspects and advantages of the present invention will become apparent and more readily appreciated from the following description of the embodiments, taken in conjunction with the accompanying drawings of which.

DETAILED DESCRIPTION OF THE INVENTION

Reference will now be made in detail to the embodiments of the present invention, examples of which are illustrated in the accompanying drawings. The embodiments are described below in order to explain the present invention by referring to the figures.

Figure 2:
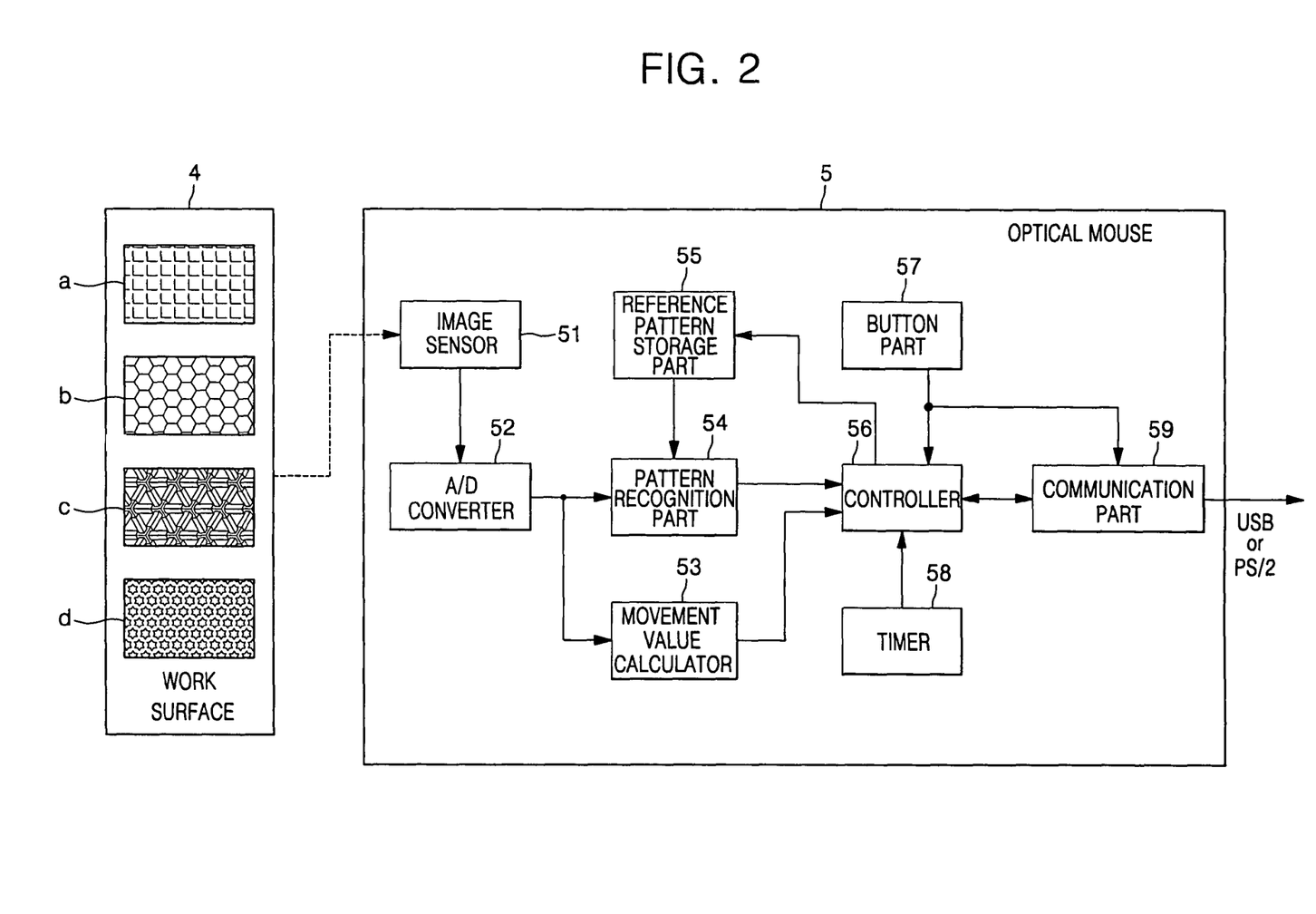
FIG. 2 is a block diagram of an optical mouse in accordance with the present invention.

FIG. 2 is a block diagram of an optical mouse in accordance with the present invention.

Referring to FIG. 2, an optical mouse 5 in accordance with the present invention includes an image sensor 51, an A/D converter 52, a movement value calculator 53, a pattern recognition part 54, a reference pattern storage part 55, a controller 56, a button part 57, a timer 58, and a communication part 59.

Hereinafter, each function of components of the optical mouse 5 will be described.

Figure 3A:
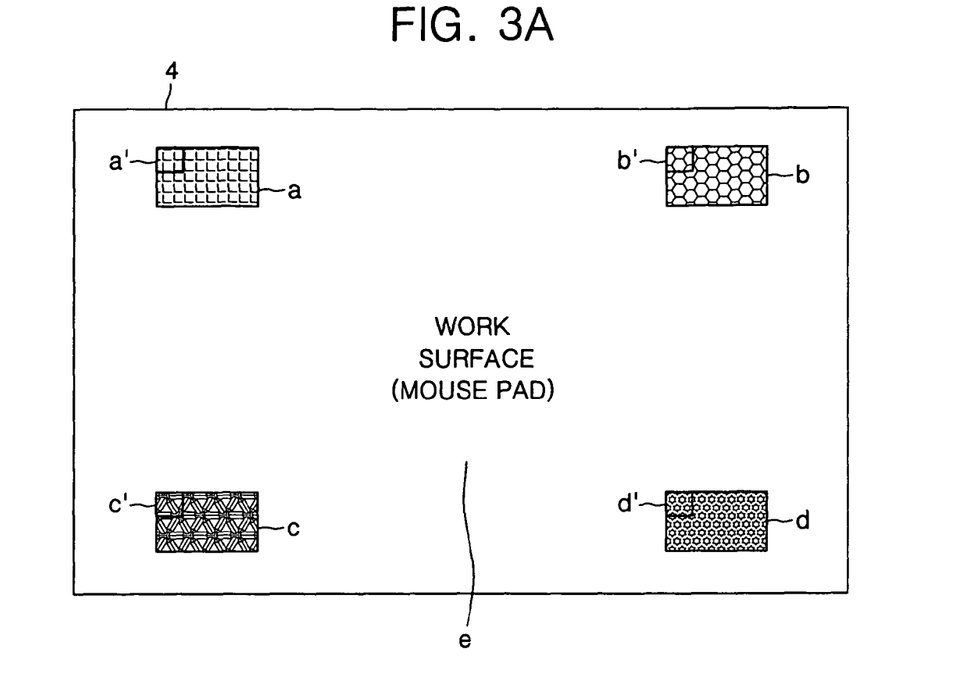
FIG. 3A illustrates a work surface in accordance with an embodiment of the present invention.
Figure 3B:
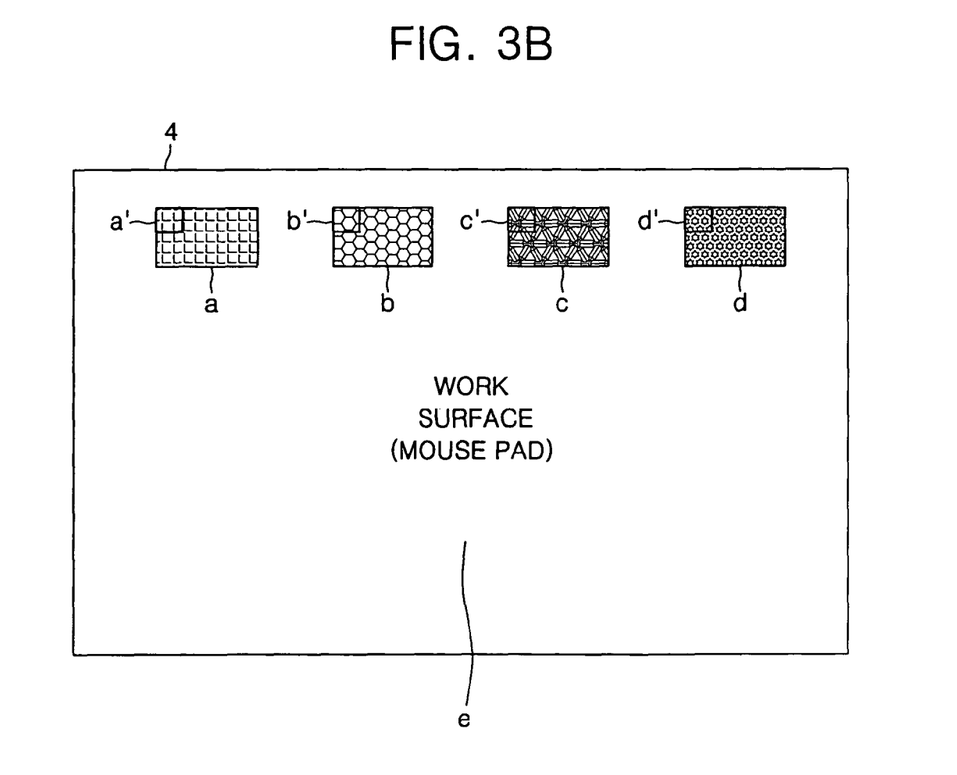
FIG. 3B illustrates a work surface in accordance with another embodiment of the present invention.

The image sensor 51 obtains an image of a work surface (a mouse pad) 4, on which a plurality of specific patterns "a"~"d" are printed on predetermined positions as shown in FIGS. 3A and 3B, as a sample image into an analog signal format.

For example, the image sensor 51 obtains an image of "a" area as a sample image when the optical mouse 5 is located on the "a" area in FIG. 3A or 3B, and obtains an image of "b" area as a sample image when on the "b" area in FIG. 3A or 3B.

In this process, the specific patterns "a"~"d" are images for generating button selection signals, which are disposed on the work surface (mouse pad), and in which reference patterns "a'"~"d'" are repeated, respectively.

The A/D converter 52 converts an analog sample image provided from the image sensor 51 into a digital sample image recognizable by the movement value calculator 53 and the pattern recognition part 54 of the optical mouse 5.

The movement value calculator 53 obtains a correlation of position between the sample image transmitted from the A/D converter 52 and the previously transmitted sample image to calculate a movement value of the optical mouse 5 responding to the correlation.

The pattern recognition part 54 sets button selection signals corresponding to the reference patterns stored in the reference pattern storage part 55. In addition, the pattern recognition part 54 compares a sample image transmitted from the A/D converter 52 with the reference patterns stored in the reference pattern storage part 55, and generates a button selection signal corresponding to a reference pattern when there is the reference pattern having the same pattern as the sample image.

The reference pattern storage part 55 stores a plurality of reference pattern images of "a'"~"d'" shown in FIGS. 3A and 3B.

At this time, the reference patterns "a'"~"d'" are the minimum unit of images which can recognize the specific patterns "a"~"d", respectively.

The controller 56 transmits only a movement value of the movement value calculator 53 to the communication part 59, or transmits both of a movement value of the movement value calculator 53 and a button selection signal of the pattern recognition part 54 to the communication part 59, depending on an operation mode of the optical mouse. When a new reference pattern is transmitted from the computer 3, the controller 56 stores the new reference pattern in the reference pattern storage part 55 to inform it to the pattern recognition part 54.

Specifically, the controller 56 transmits a movement value of the movement value calculator 53 to the communication part 59 when the operation mode is a general mode, and simultaneously transmits a movement value of the movement value calculator 53 and a button selection signal of the pattern recognition part 54 to the communication part 59 when the operation mode is a pattern recognition mode.

The controller 56 receives the same button selection signal from the pattern recognition part 54 during "pattern recognition mode setting time", or sets a pattern recognition mode to an operation mode of the optical mouse when a button selection combination signal corresponding to "pattern recognition mode setting condition" is received from the button part 57, and releases the pattern recognition mode after transmitting the button selection signal of the pattern recognition part 54 to the communication part 59 and sets a general mode to an operation mode of the optical mouse.

In this process, the "pattern recognition mode setting time" is a time that a user continuously selects a specific pattern in order to generate a button selection signal set to one specific pattern of the plurality of specific patterns, which can be arbitrarily set by a user.

The "pattern recognition mode setting condition", another method of operating in the pattern recognition mode, is a button combination selected by a user in order to generate a button selection signal set to a specific pattern when one specific pattern of the plurality of specific patterns is selected, which can be arbitrarily set by a user.

For example, when the optical mouse of the present invention includes a left button and a right button, and the "pattern recognition mode setting condition" is set by a user as a state of that both the left button and the right button are simultaneously pushed, the user can set an operation mode of the optical mouse to the pattern recognition mode by simultaneously pushing the left button and the right button. Of course, when one button is released, the optical mouse returns to the general mode.

In addition, the button part 57 includes a plurality of mechanical buttons (for example, a left button and a right button), and each button generates a corresponding button selection signal in response to a click of a user.

The button part 57 may further include a scroll device (not shown) to generate a scroll signal corresponding to a scroll direction of the scroll device.

The timer 58 calculates a time lapsed in the pattern recognition mode, and is reset whenever an operation mode of the controller 56 is changed from the pattern recognition mode to the general mode. The timer 58 is used to avoid continuing in the pattern recognition mode infinitely.

The communication part 59 is an interface device such as USB or PS/2, which interfaces data between the computer and the optical mouse. That is, when a movement value or a button selection signal is received, the communication part 59 converts it into data having a data format according to a USB or PS/2 protocol and then transmits the data to the computer 3, and when the data having a data format according to the USB or PS/2 protocol is received from the computer 3, the communication part 59 obtains control data from the received data and then transmits the control data to the controller 56.

At this time, the data format according to the USB or PS/2 protocol is well known, and therefore, its description will be omitted.

Figure 4:
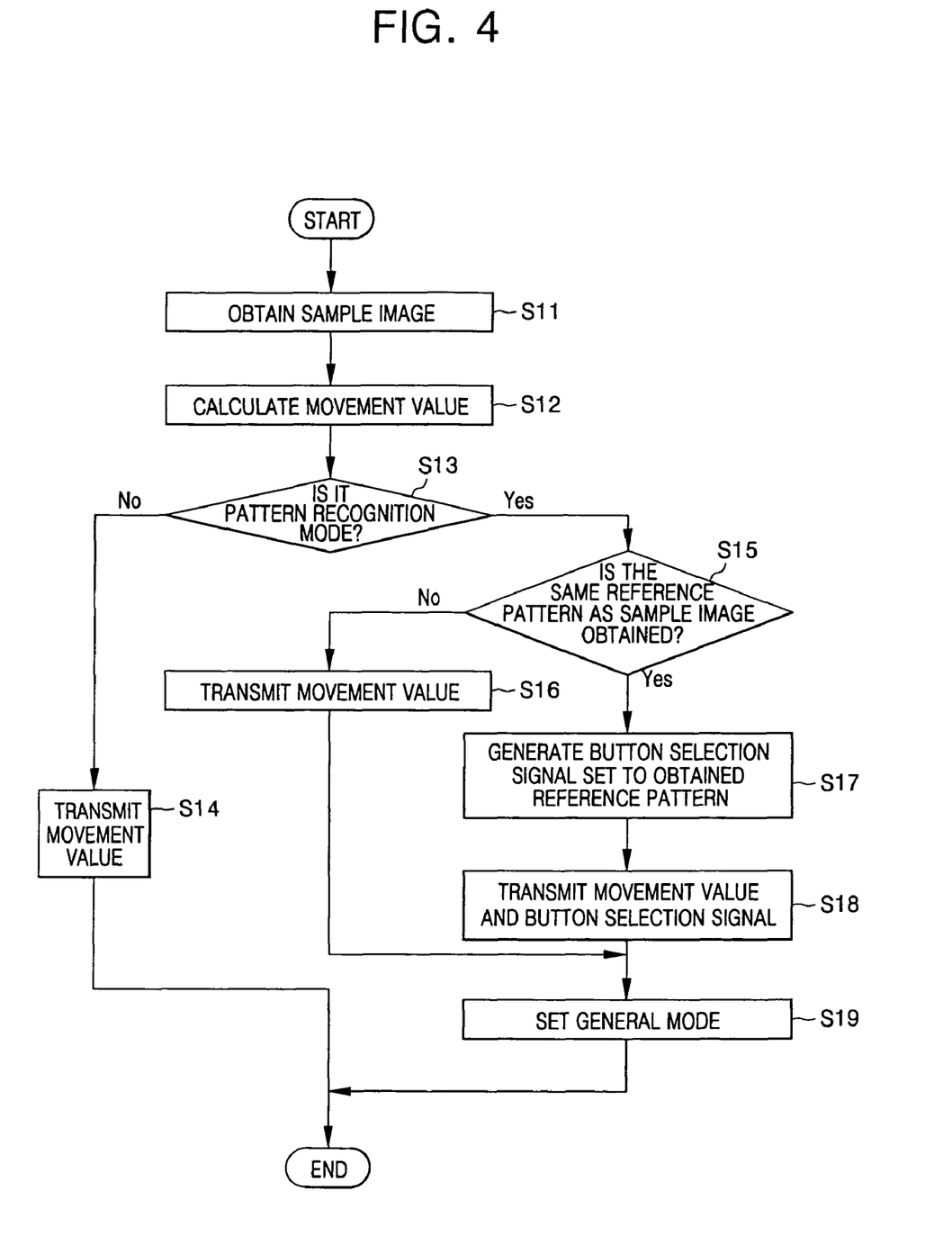
FIG. 4 is a flowchart showing a method of operating the optical mouse in FIG. 2.

FIG. 4 is a flowchart showing a method of operating the optical mouse 5 in FIG. 2.

The optical mouse 5 newly obtains a predetermined image on a surface of a mouse pad as a sample image through the image sensor 51 and the A/D converter 52 (S11).

The movement value calculator 53 compares the sample image newly obtained in step S11 with the previously sampled image to calculate a movement value of the optical mouse (S12).

Then, while performing step S12, the controller 56 determines whether an operation mode of the optical mouse is set to a pattern recognition mode (S13).

As a result of the determination of step S13, when the operation mode of the optical mouse is a general mode other than the pattern recognition mode, the controller 56 transmits the movement value generated in step S12 to the computer 3 (S14).

On the other hand, when the operation mode of the optical mouse is the pattern recognition mode as a result of the determination of step S13, the pattern recognition part 54 retrieves a plurality of reference pattern images stored in the reference pattern storage part 55, and obtains a reference pattern having the same pattern as the sample image newly obtained in step S11 (S15).

When the reference pattern having the same pattern as the newly obtained sample image is not obtained in step S15, no signal is generated from the pattern recognition part 54, and the controller 56 transmits the movement value generated in step S12 to the computer 3 (S16).

On the other hand, when the reference pattern having the same pattern as the newly obtained sample image is obtained in step S15, the pattern recognition part 54 generates a button selection signal set to the reference pattern (S17).

Then, the controller 56 receives the movement value and the button selection signal generated in step S12 or S17 and then transmits them to the computer 3 (S18).

When step S16 or S18 is completed, the controller 56 resets the timer 58, and sets an operation mode of the optical mouse to a general mode (S19). Here, not shown in FIG. 4, timer 58 measures a time lapsed in S17 and S18. If the lapsed time is over a pre-determined value—it is assumed that user may unintentionally set pattern recognition mode, then controller 56 transmits the movement value.

Therefore, the optical mouse 5 completes the operation of the currently obtained sample image, and repeatedly performs steps S11 to S19 for performing the operation of the sample image.

As described above, the optical mouse in accordance with the present invention is capable of recognizing a plurality of specific patterns to generate a plurality of button selection signals, without adding mechanical buttons.

Therefore, it is possible for the optical mouse to include a minimum number of buttons to provide more number of button selection signals to the computer. Notice that it is natural to extend to any optical pointing device such as, but not limited to, optical pen input device, optical presentation input device, and optical finger pointing device. Especially, the present invention is effective to small size pointing device that does not have enough space to make mechanical buttons.

Figure 5:
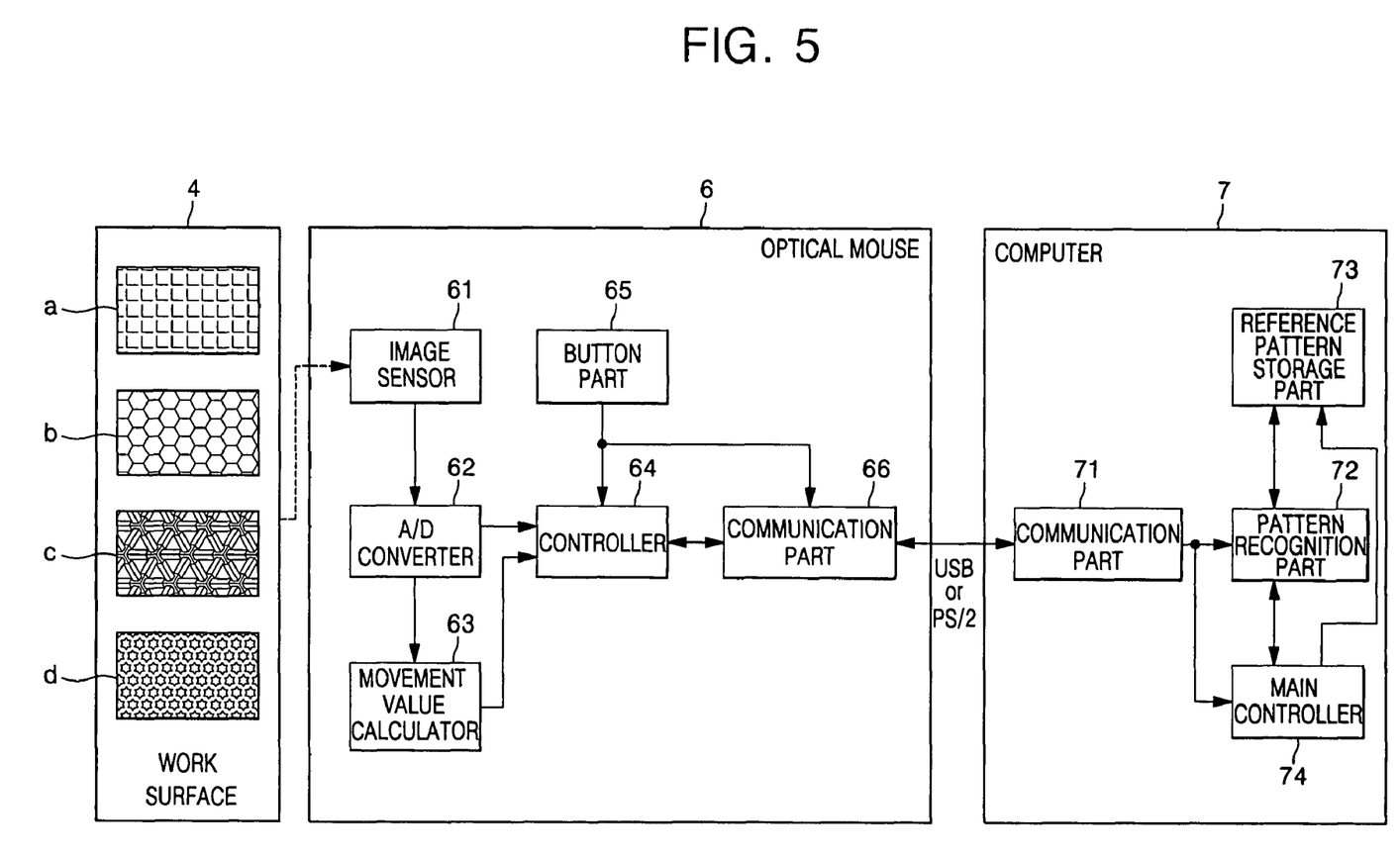
FIG. 5 is a block diagram of an optical pointing system in accordance with the present invention.

FIG. 5 is a block diagram of an optical pointing system in accordance with the present invention.

Referring to FIG. 5, the optical pointing system of the present invention includes an optical mouse 6 and a computer 7. The optical mouse 6 includes an image sensor 61, an A/D converter 62, a movement value calculator 63, a controller 64, a button part 65, and a communication part 66. The computer 7 includes a communication part 71, a pattern recognition part 72, a reference pattern storage part 73, and a main controller 74.

Each function of components of the optical mouse will now be described.

The image sensor 61 is disposed on a work surface (mouse pad), on which a plurality of specific patterns "a"~"d" are printed as shown in FIG. 3A or 3B, to obtain an image of a portion of the work surface as an analog sample image.

The A/D converter 62 converts the analog sample image provided from the image sensor 61 into a digital sample image recognizable by the movement value calculator 63 and the controller 64 of the optical mouse 6.

The movement value calculator 63 obtains a correlation between the sample image transmitted from the AND converter 62 and the previously transmitted sample image to calculate a movement value of the optical mouse 6.

The controller 64 transmits the movement value of the movement value calculator 63 to the communication part 66, or transmits the sample image of the A/D converter 62 to the communication part 66, in response to an operation mode of the optical mouse.

That is, the controller 64 transmits the movement value of the movement value calculator 63 to the communication part 66 when the operation mode is a general mode, and transmits the sample image of the AND converter 62 to the communication part 66 when the operation mode is a pattern recognition mode.

The controller 64 sets the pattern recognition mode to the operation mode of the optical mouse when a button selection combination signal corresponding to a "pattern recognition mode setting condition" is received from the button part 65, and releases the pattern recognition mode after transmitting the sample image of the A/D converter 62 to the communication part 66 and sets the general mode to the operation mode of the optical mouse.

The button part 65 includes a plurality of mechanical buttons (for example, a left button and a right button), and each button generates a corresponding button selection signal in response to a click of a user.

The button part 65 may further include a scroll device (not shown) to generate a scroll signal corresponding to a scroll direction of the scroll device.

The communication part 66 is an interface device such as USB or PS/2, which interfaces data between the computer and the optical mouse.

Figure 6:
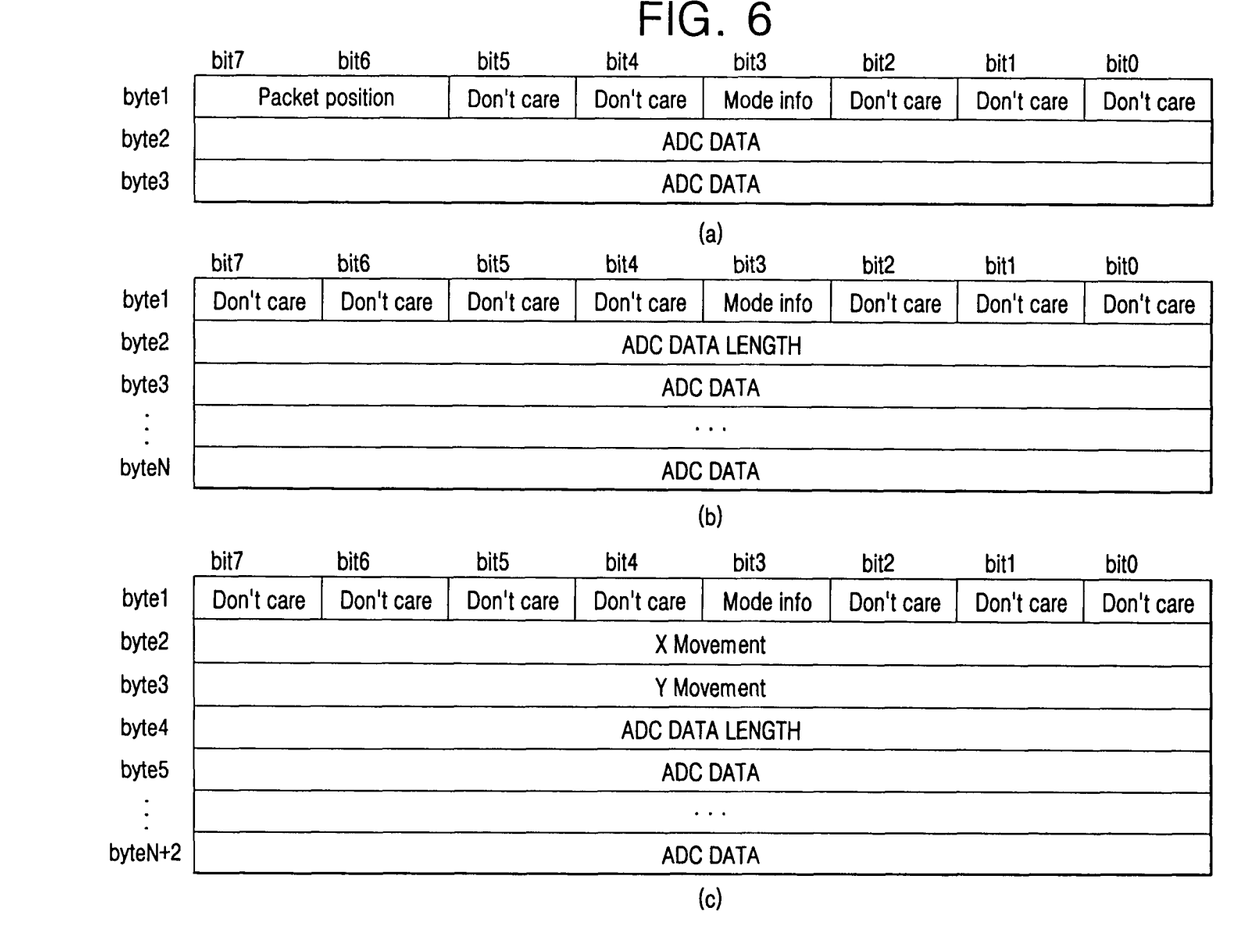
FIG. 6 illustrates a data format of data transmitted in a pattern recognition mode of the optical mouse in FIG. 5.

That is, when a movement value or a button selection signal transmitted from the controller 64 or the button part 65 is received, the communication part 66 converts it into data having a data format according to a USB or PS/2 protocol to transmit the data to the computer 7, and when the sample image is received from the controller 64, the communication part 66 converts the sample image into data having a data format of FIG. 6 to transmit the data to the computer 7. In addition, when the data is received from the computer 7, the communication part 66 obtains control data from the received data and then transmits the control data to the controller 64.

Each function of components of the computer 7 will now be described.

The communication part 71 is an interface device such as USB or PS/2, similarly to the communication part 66 of the optical mouse 6, which interfaces data between the computer and the optical mouse.

Specifically, when control data is received from the main controller 74, the communication part 71 generates data according to a USB or PS/2 protocol to transmit the data to the optical mouse 6. In addition, when the data having a data format according to a USB or PS/2 protocol is received from the optical mouse 6, the communication part 71 obtains a movement value or a button selection signal from the received data to and then transmit it to the main controller 74, and when the data of FIG. 6 is received from the optical mouse 6, the communication part 71 obtains the sample image of the optical mouse 6 from the received data and then transmits it to the pattern recognition part 72.

The pattern recognition part 72 sets button selection signals corresponding to reference patterns stored in the reference pattern storage part 73. In addition, the pattern recognition part 72 receives a sample image transmitted from the communication part 71, and compares the received sample image with the reference patterns stored in the reference pattern storage part 73. When there exists a reference pattern having the same pattern as the received sample image, the pattern recognition part 72 generates a button selection signal set to the reference pattern.

The reference pattern storage part 73 stores a plurality of reference pattern images of "a'"~"d" in FIGS. 3A and 3B, similarly to the reference pattern storage part 55 in FIG. 2.

The main controller 74 is a device such as a CPU for controlling general operations of the computer, which sets commands for executing specific operations or application programs corresponding to the button selection signals provided from the pattern recognition part 72. In addition, when the movement value of the optical mouse 6 is received from the communication part 71, the main controller 74 moves a pointer displayed on a computer screen in response to the received movement value, and the button selection signal is received from the pattern recognition part 72, the main controller 74 executes a command set to the received button selection signal to execute a specific function or a specific application program.

In addition, the main controller 74 provides an application program, such that a user can select a new reference pattern. When the user selects a new reference pattern using the provided application program, the main controller 74 stores the selected new reference pattern in the reference pattern storage part 73, and informs to the pattern recognition part 72 that information of the reference pattern is updated.

At this time, the pattern recognition part 72 determines whether the new reference pattern is stored in the reference pattern storage part 73, and sets button selection signals corresponding to a plurality of reference patterns including the new reference pattern.

FIG. 6 illustrates a format of data transmitted in a pattern recognition mode of the optical mouse in FIG. 5.

Format (a) is a data format for divisionally transmitting a sample image of the optical mouse, and formats (b) and (c) are data formats for collectively transmitting the sample image of the optical mouse.

The data format (a) has a small data length of byte3, and includes a header field byte1, and data fields byte2 and byte3. In addition, the header field byte1 stores data for informing that the optical mouse operates in a pattern recognition mode, and data for informing a data transmission sequence. The data fields byte2 and byte3 store data ADC DATA of divided sample images of the optical mouse.

In particular, the data Mode info for informing that the optical mouse operates in a pattern recognition mode is set to "0", and stored in bit3 of the header field byte1, because "1" is always stored in bit3 of the header field byte1 when the optical mouse operates in a general mode to generate data having a data format according to a USB or PS/2 protocol.

Therefore, the communication part 71 of the computer 7 reads bit3 of the header field byte1 to determine whether the data having a data format according to a USB or PS/2 protocol is received or the data having a data format of FIG. 6 is received.

In addition, the data format (a) stores data for informing first data (for example, "00") of data divisionally transmitted to bit6 and bit7 of the header field byte1, data for informing final data (for example, "11") of the divisionally transmitted data, or data for informing middle data (for example, "01" or "10") of the divisionally transmitted data.

The data format (b) includes a header field byte1 and data fields byte2 to byteN. The header field byte1 stores the same information as the format (a). The data fields byte2~byteN store sample image data length information ADC DATA LENGTH, and undivided sample image data ADC DATA of the optical mouse.

The data format (c) includes a header field byte1 and data fields byte2 to byteN+2. The header field byte1 stores the same information as the format (a). The data fields byte 2 to byteN+2 store a movement value (X movement, Y movement) of the optical mouse, sample image data length information ADC DATA LENGTH, and undivided sample image data ADC DATA of the optical mouse.

Figure 7A:
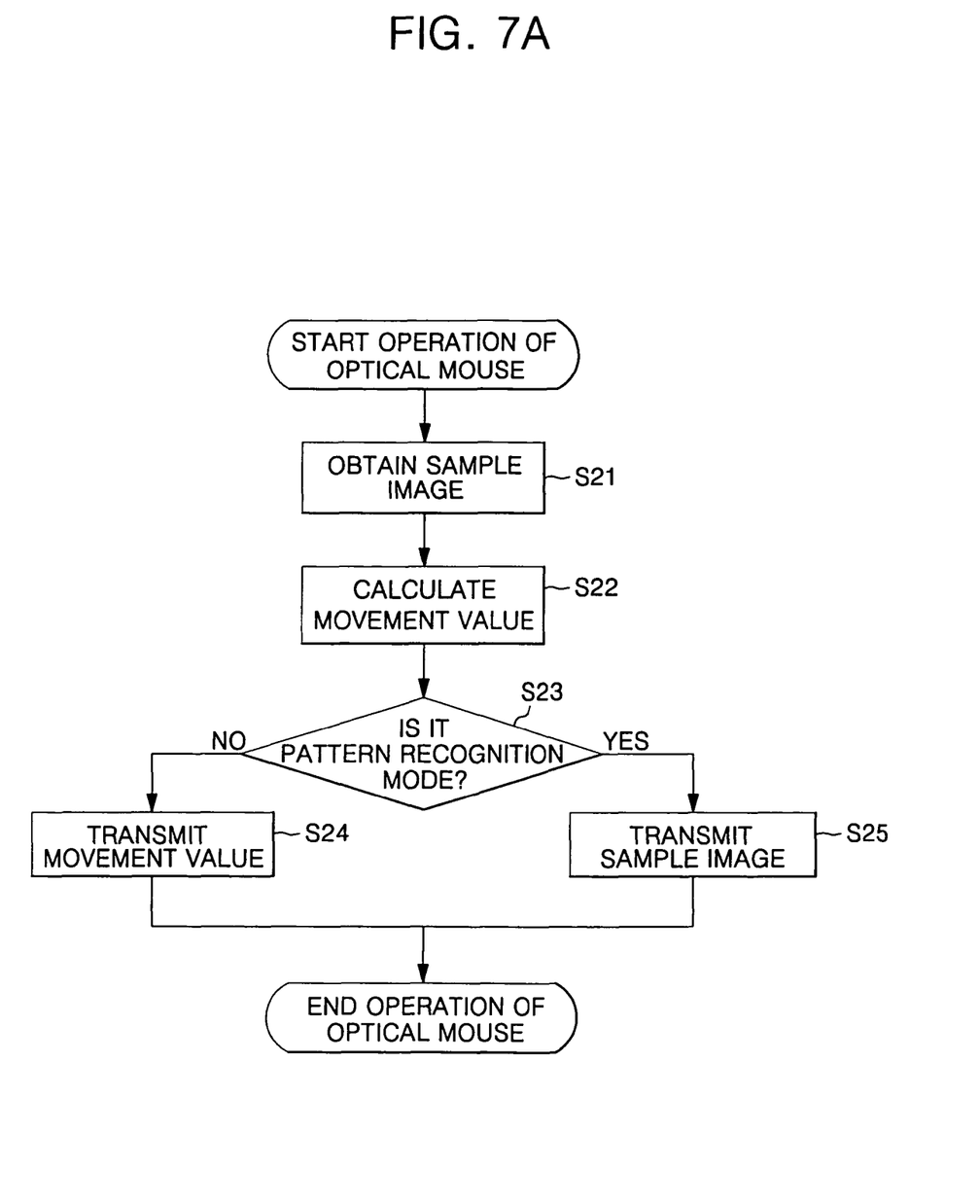
FIG. 7A is a flowchart showing a method of operating the optical mouse in FIG. 5.
Figure 7B:
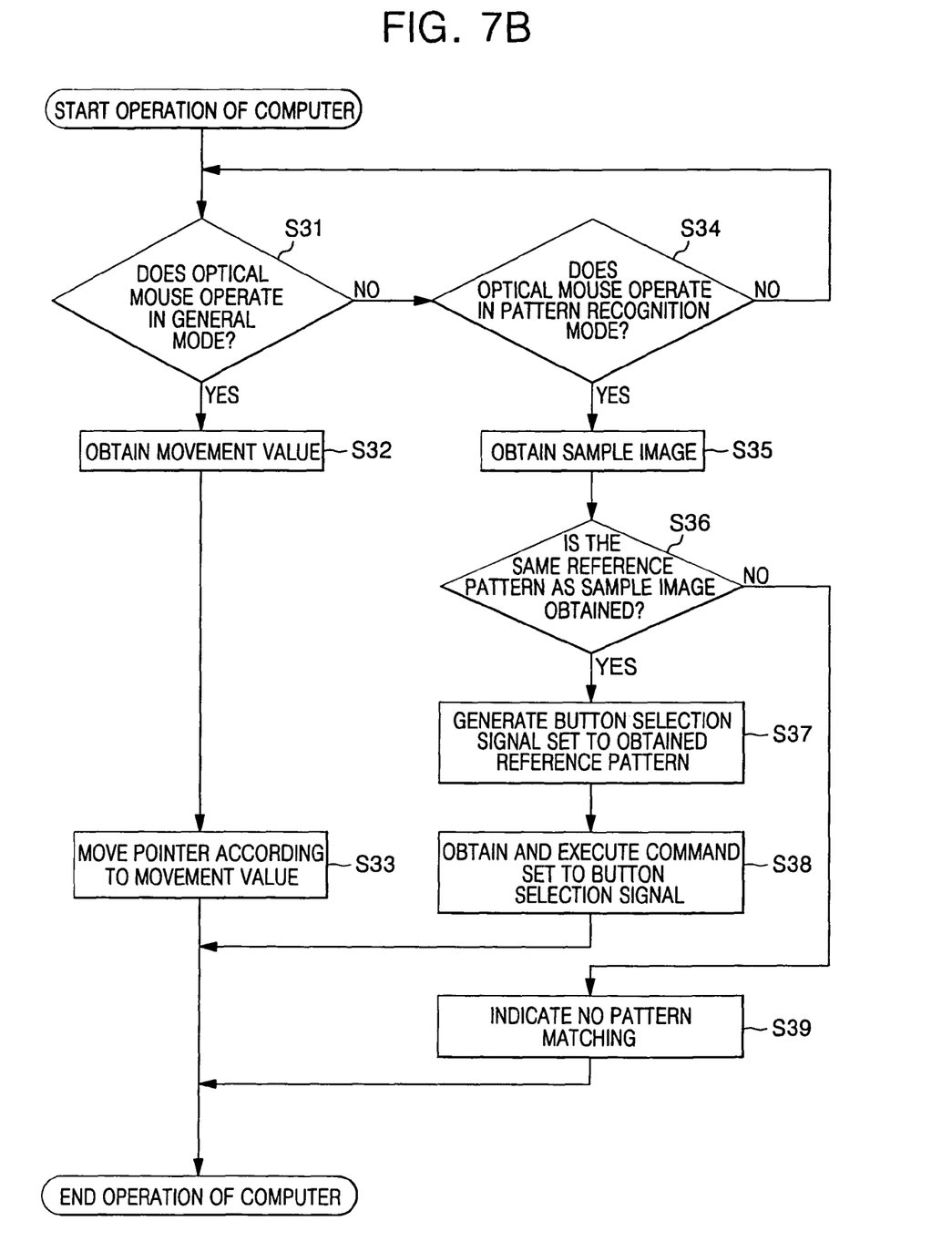
FIG. 7B is a flowchart showing a method of operating the computer in FIG. 5.

FIG. 7A is a flowchart showing a method of operating the optical mouse in FIG. 5, and FIG. 7B is a flowchart showing a method of operating the computer in FIG. 5. The optical pointing system in FIG. 5 operates by simultaneously performing the devices of FIGS. 7A and 7B. First, a method of operating an optical mouse will be described with reference to FIG. 7A.

An optical mouse 6 newly obtains an image of a predetermined area of a work surface as a sample image through an image sensor 61 and an A/D converter 62 (S21).

A movement value calculator 63 compares the sample image newly obtained in step S21 with the previously obtained image to calculate a movement value of the optical mouse (S22).

Then, while performing step S22, a controller 64 receives the sample image obtained in step S21 and the movement value of the optical mouse obtained in step S22, and determines whether the current operation mode of the optical mouse is a pattern recognition mode (S23).

As a result of the determination of step S23, when the current operation mode of the optical mouse is a general mode other than the pattern recognition mode, the controller 64 transmits the movement value to a computer 7 through a communication part 66 (S24).

As a result of the determination of step S23, when the current operation mode of the optical mouse is the pattern recognition mode, the controller 64 transmits the movement value and the sample image generated in steps S21 and S22 to the computer 7 through the communication part 66.

Then, operations of the computer will be described with reference to FIG. 7B.

Before performing a method of operating the computer, the computer 7 performs an initialization operation to set a plurality of button selection signals corresponding to a plurality of reference patterns, and commands for executing specific application programs corresponding to the plurality of button selection signals.

When the data is received from the optical mouse 6, a communication part 71 of the computer 7 analyzes the received data format to determine whether the operation mode of the optical mouse is a general mode or a pattern recognition mode. When the data having a data format according to a USB or PS/2 protocol is received from the optical mouse, the communication part 71 confirms that the optical mouse operates in the general mode (S31), and obtains a movement value from the received data (S32).

A main controller 74 receives the movement value of the optical mouse obtained in step S32, and moves a pointer displayed on a computer screen on the basis of the movement value of the optical mouse (S33).

On the other hand, when the data having a data format of FIG. 6 is received from the optical mouse, the communication part 71 confirms that the optical mouse operates in the pattern recognition mode (S34), and obtains the sample image from the received data (S35).

A pattern recognition part 72 compares the sample image obtained in step S35 with a plurality of reference pattern images stored in a reference pattern storage part 73, and determines whether there is a reference pattern having the same pattern as the sample image (S36).

As a result of the determination of step S36, when there is a reference pattern having the same pattern as the sample image, the pattern recognition part 72 generates a button selection signal set to the reference pattern (S37).

Then, the main controller 74 executes a command set to the button selection signal generated in step S37 (S38). That is, the main controller 74 executes a specific command in response to the button selection signal to execute a specific function of a specific application program.

But, as a result of the determination of step S36, when there is no reference pattern having the same pattern as the sample image, the pattern recognition part 72 generates an indication signal of no pattern matching and does not generate any movement signal (S39).

As described above, the optical pointing system of the present invention enables the optical mouse to provide a sample image and the computer to generate a button selection signal using the sample image to perform an operation corresponding to the button selection signal.

In addition, it is possible to freely update the reference pattern according to a user's request, and freely change the number of button selection signals that can be generated from the optical pointing system.

Further, while the optical pointing system in which the optical mouse transmits a sample image only in a pattern recognition mode is described as an exemplary embodiment, the sample image and the movement value can be simultaneously transmitted using a data structure as shown in the format (c) of FIG. 6.

As can be seen from the foregoing, an optical mouse, an optical pointing system, and a method of operating the same of the present invention are capable of recognizing a plurality of specific patterns to generate button selection signals using the minimum number of mechanical buttons, thereby generating button selection signals required by a user and minimizing the manufacturing cost and size of the optical mouse.

In addition, it is possible to change the number of specific patterns and reference patterns to readily change the number of button selection signals provided by the optical mouse, thereby increasing an application range of the optical mouse and the optical pointing system.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. An optical pointing device comprising:
    an image obtaining part for continuously obtaining an image on a work surface as a sample image;
    a movement value calculator for comparing the sample image with the previously obtained image to calculate and output a movement value;
    a button selection signal generator for outputting a button selection signal corresponding to the sample image, when the sample image is the same as one of a plurality of reference patterns; and
    a controller for providing the button selection signal and the movement value to a computing device when the button selection signal is transmitted from the button selection signal generator, or providing the movement value only to the computing device when the button selection signal is not transmitted from the button selection signal generator.

2. The optical pointing device according to claim 1, wherein the button selection signal generator comprises:
    a reference pattern storage part for storing the plurality of reference patterns; and
    a pattern recognition part for setting button selection signals corresponding to the reference patterns, and outputting the button selection signal set to the reference pattern when the sample image having the same pattern as the reference pattern is received.

3. The optical pointing device according to claim 1, wherein the reference patterns have different pattern images.

4. The optical pointing device according to claim 1, wherein the work surface comprises the specific patterns having different pattern images, wherein each pattern image contains repetitive pattern.

5. The optical pointing device according to claim 1, further comprising a timer for informing a lapse of time to control the button selection operation.

6. The optical pointing device according to claim 5, wherein the controller transmits the button selection signal of the button selection signal generator to the computing device when the same button selection signal is received from the button selection signal generator for a predetermined time.

7. The optical pointing device according to claim 1, further comprising a button part having at least one mechanical button, and outputting a button selection signal corresponding to the mechanical button when the mechanical button is pushed.

8. The optical pointing device according to claim 7, wherein the controller transmits the button selection signal of the button selection signal generator to the computing device when a button selection signal having a predetermined button combination is received from the button part.

9. The optical pointing device according to claim 1, wherein the controller stores the reference pattern in the reference pattern storage part when the reference pattern is received from the external, and informs to the pattern recognition part that the reference pattern storage part is updated.

10. A method of operating an optical pointing device including an image obtaining part, a movement value calculator, and a button selection signal generator, the method comprising the steps of:
    obtaining a sample image by the image obtaining part;
    comparing the sample image with a reference sample image to calculate a movement value by the movement value calculator;
    comparing the sample image with a plurality of reference patterns to obtain a matching reference pattern, and generating a button selection signal corresponding to the matching reference pattern by the button selection signal generator; and
    providing the button selection signal and the movement value to a computing device when the button selection signal is generated, or providing the movement value only to the computing device when the button selection signal is not generated.

11. The method according to claim 10, wherein in the step of providing the data, the button selection signal and the movement value are provided to the computing device only when the button selection signal is generated for a predetermined time.

12. The method according to claim 10, wherein in the step of providing the data, the button selection signal and the movement value are provided to the computing device only when at least one mechanical button is selected by a predetermined combination.

* * * * *